US008782515B2

(12) United States Patent  
Le Chevalier et al.

(10) Patent No.: US 8,782,515 B2
(45) Date of Patent: Jul. 15, 2014

(54) DOCUMENT CONVERSION CORRELATION ENGINE

(75) Inventors: Vincent Le Chevalier, San Jose, CA (US); Charles F. Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 168 days.

(21) Appl. No.: 13/340,006

(22) Filed: Dec. 29, 2011

(65) Prior Publication Data

US 2013/0174010 A1  Jul. 4, 2013

(51) Int. Cl.
 *G06F 17/00* (2006.01)
(52) U.S. Cl.
 USPC .......... 715/236; 715/780; 715/731; 705/7.25; 705/7.33; 726/1

(58) Field of Classification Search
 USPC ........ 715/731, 236, 234, 780; 705/7.25–7.44; 726/1
 See application file for complete search history.

(56) References Cited

U.S. PATENT DOCUMENTS

| 2011/0213655 A1* | 9/2011 | Henkin et al. ............. 705/14.49 |
| 2012/0158737 A1* | 6/2012 | Levy et al. .................... 707/748 |
| 2013/0015946 A1* | 1/2013 | Lau et al. ....................... 340/5.2 |

* cited by examiner

*Primary Examiner* — Quoc A Tran
(74) *Attorney, Agent, or Firm* — Fenwick & West LLP (57) ABSTRACT

Embodiments of the disclosure provide a system for correlating document pages. The system receives a source image of a document page and a rendered image of a markup language page converted from the document page. The system then performs a correlation analysis between the source image and the rendered image. Next, the system determines a correlation factor between the source image and the rendered image based on the correlation analysis, wherein the correlation factor indicates a page fidelity between the document page and the markup language page converted from the document page.

24 Claims, 5 Drawing Sheets

DOCUMENT CONVERSION CORRELATION ENGINE

CROSS-REFERENCE TO RELATED APPLICATION

This application is related to U.S. patent application Ser. No. 13/253,011, which is incorporated by reference in its entirety.

BACKGROUND

1. Field of the Invention

This disclosure relates to a publishing platform for aggregating, managing, and delivering electronic content to connected consumer electronic devices.

2. Description of the Related Art

The education publishing industry faces a number of significant challenges to effectively delivering media and services through an online delivery network. These challenges center around four discrete phases:

1) Ingestion: A lack of digital textbook standardization, a plethora of incompatible formats, and a lack of integration and interoperability between publishers makes it difficult to ingest and aggregate a large volume of educational content efficiently and reliably.
2) Publishing: Significant transformation of education content needs to be undertaken to ensure that the content is suited to publish across a variety of client devices that users may use to access the content.
3) Distribution: In an electronic distribution environment, particular attention needs to be given to issues of content protection and rights management, as well as service policies and quality of service, so that content providers are fairly compensated and users of the content perceive the value and reliability of the service.
4) Connected Services: In an educational platform, there exists the potential to deliver a rich user experience that extends beyond electronic access to textbooks. To implement such connected services would require complex business rules and content models that are unavailable in existing education digital publishing services.

Effectively enabling and managing each of the above four phases has not yet been accomplished by the education publishing industry. Accordingly, this has inhibited the growth of delivering media and services through an online delivery network.

SUMMARY

Embodiments of the invention provide a system for correlating document pages. The system receives a source image of a document page and a rendered image of a markup language page converted from the document page. The system then performs a correlation analysis between the source image and the rendered image. Next, the system determines a correlation factor between the source image and the rendered image based on the correlation analysis, wherein the correlation factor indicates a page fidelity between the document page and the markup language page converted from the document page.

In one embodiment, the document page comprises elements of at least one of an image, a graph, a table, a formula, and a body of texts, wherein the document page elements are converted into markup language page elements with location and composition information to preserve page fidelity.

In one embodiment, the converted markup language page is a HTML5 page.

In one embodiment, the rendered image of the markup language page is rendered for a specific web browser on a specific software platform.

In one embodiment, performing the correlation analysis comprises applying at least one of the following algorithms on the source image and the rendered image: a text comparison algorithm, an image comparison algorithm, a principal components analysis (PCA) algorithm and a linear discriminant analysis (LDA) algorithm.

In one embodiment, the correlation factor is a number, which ranges between 0 indicating no correlation and 100 indicating a perfect match.

In one embodiment, a minimum requirement of the page fidelity corresponds to a threshold value in the correlation factor.

One skilled in the art will readily recognize from the following discussion that alternative embodiments of the structures and methods illustrated herein may be employed without departing from the principles of the invention described herein.

DETAILED DESCRIPTION OF THE EMBODIMENTS

System Overview

The successful and rapid growing adoption of electronic books and web based publishing services is sometimes limited by the available digital content to offer. Publishers have to separately create digital versions of their content besides printed copies to support the new digital offerings. This separate process may introduce digital format issues, increased costs, and production delays that negatively affect the availability of the digital books at content and service providers.

Despite the advance in digital conversion technologies and on-going standardization efforts in the creation and deployment of the electronic books, such as ePub standard and development toolkits, the converted digital content sometimes differs considerably from its original printed equivalent in at least one aspect: page fidelity. Page fidelity refers to the page structure of the original document, including the pagination of the original printed document, the number of columns and arrangement of paragraphs, the placement and appearance of graphics, titles and captions, and the fonts used. Page fidelity is usually not an issue for trade books given their relatively simple text structure and page layout. However, for some other categories of books (e.g., textbooks, education, travel, art, and cooking books), whose images, graphs, tables, maps, proprietary fonts, and multi-columns of text are assembled into complex sets of customized publications, maintaining page fidelity may be highly desired but quite challenging when converting into ePub format or modern markup language web pages.

Figure 1:
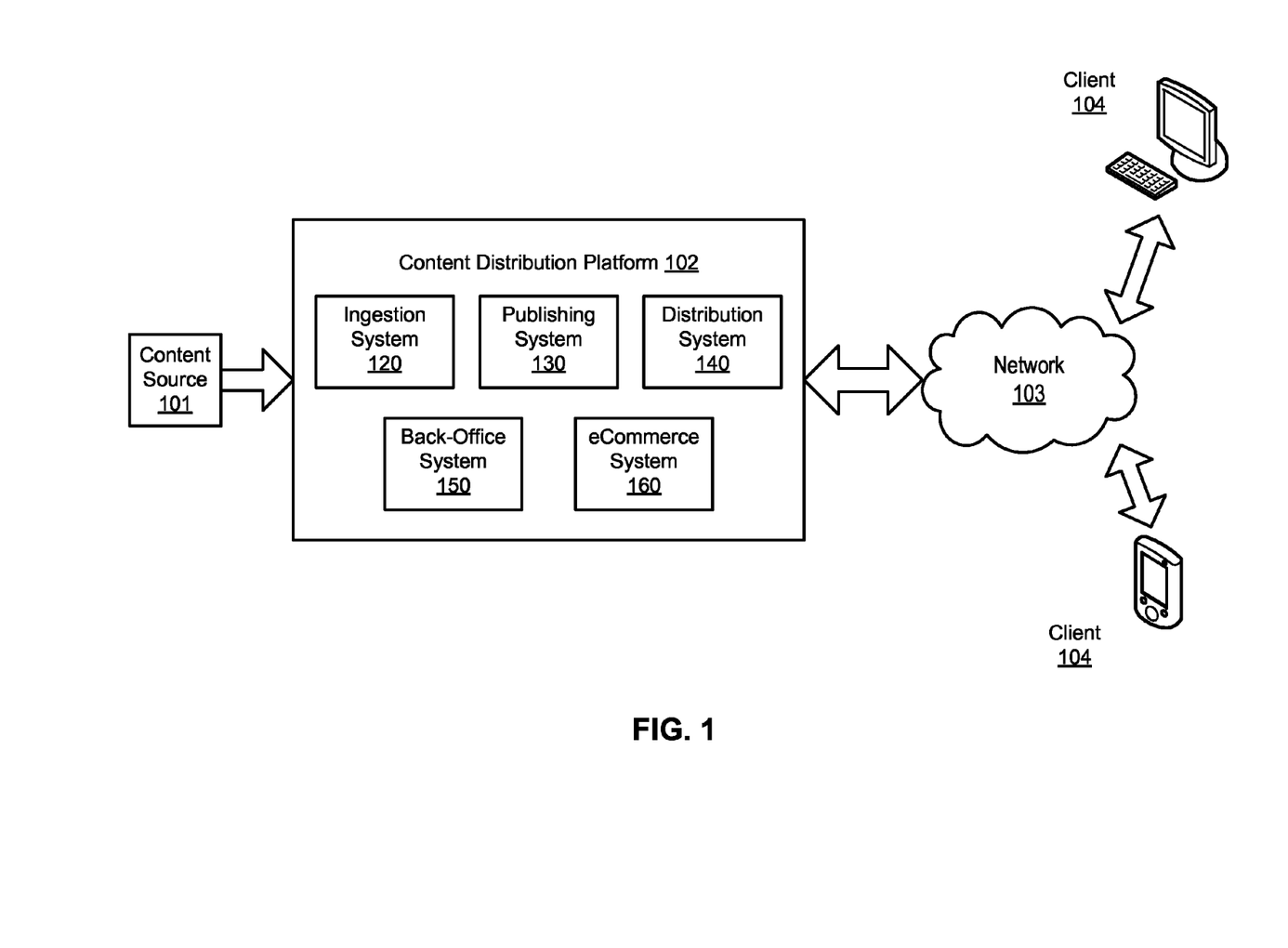
FIG. 1 is a block diagram illustrating an environment for a digital educational reading platform, in accordance with an embodiment of the invention.
Figure 2:
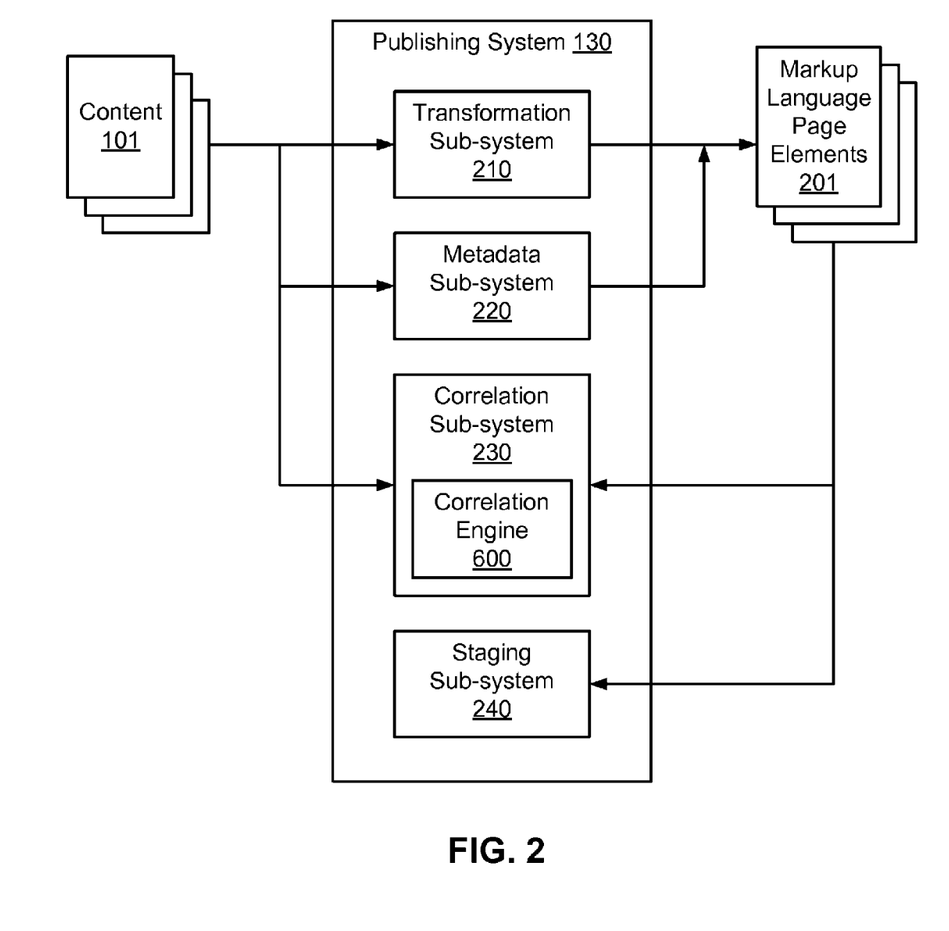
FIG. 2 is a block diagram illustrating a publishing system, in accordance with an embodiment of the invention.

Embodiments of the invention provide a system referred to as a "document conversion correlation engine" that automatically quantifies the differences in page fidelity between a printed document (e.g., a PDF file) and its markup language transformation (e.g., HTML5 web pages). This correlation engine is part of a content publishing system, an example of which is illustrated in FIG. 2. This content publishing system is in turn a part of an overall content distribution platform, an example of which is illustrated in FIG. 1. The content distribution platform not only facilitates aggregation, management, and distribution of digital education content, but also provides an integrated solution for digital publishing and online education services.

FIG. 1 illustrates a block diagram of a system environment for a digital content delivery and online education services in accordance with an embodiment of the invention. The system environment facilitates flexible distributions of digital books from publishers to end users. The content distribution platform 102 is described in more detail in patent application U.S. Ser. No. 13/253,011 titled "Electronic Content Management And Delivery Platform" filed by the same applicant on 4 Oct. 2011, the disclosure of which is incorporated herein by reference in its entirety.

As shown in FIG. 1, the digital reading environment comprises a content source 101, a content distribution platform 102, a network 103, and one or more clients 104. The content source 101 includes digital and printed content automatically gathered and aggregated from a large number of publishers, categories, and partners. Examples of content include textbooks, trade books, magazines, newspapers, user-generated content, web content, and advertising content.

The content distribution platform 102 aggregates, validates, transforms, packages, and monetizes the content collected by the content source 101 into a number of business services, prior to distribution to the clients 104 over the network 103. The platform comprises five systems: an ingestion system 120, a publishing system 130, a distribution system 140, a back-office system 150, and an eCommerce system 160.

The ingestion system 120 first gathers information on the type, file formats, and file manifest of the content. The ingestion system then checks files' integrity and conformity to standards, such as PDF, ePUB2, ePUB3, XML, HTML, and other formats. Content files that fail the integrity and conformity checks are flagged for further testing and repairing. Each content file that passes the checks is assigned a unique identifier and stored in a database for access by the publishing system 130.

The publishing system 130 transforms ingested documents into markup language documents, for example, an HTML5 web page with enhanced metadata, which is well-suited to distribution across a wide variety of computing devices connected to the content distribution platform 102 via the network 103. The transformed content preserves the original page structure of the printed document, including the pagination of the original printed document, the number of columns and arrangement of paragraphs, the placement and appearance of graphics, titles and captions, and the fonts used, which are collectively referred to as preserving "page fidelity" of the printed document. Page fidelity is preserved by the publishing system 130, regardless of the original format of the source content provided by the content provider, and regardless of the complexity of the layout of the original document. More details of the publishing system 120 are described with reference to FIG. 2 below.

The distribution system 140 packages the content for delivery and uploads the content to content distribution networks. Then, the distribution system 140 makes the content available to end-users based on the content's digital rights management policies.

The back-office system 150 handles tasks dedicated to running business within the content distribution platform, such as accounting, human resource, and project management. The back-office system 150 also manages the interactions with customers, clients, and sales.

The eCommerce system 160 manages the online processes of marketing, selling, servicing and receiving payments for digital products and services. Hence the eCommerce system 160 is closely interfaced to the publishing system 130, distribution system 140, as well as the back-office system 150.

The network 103 facilitates content and service distribution and communications between various components of the system environment. Contents are packaged and distributed across the network 103 for client consumption. The overall quality of service received by the clients is also monitored and reported back to the content distribution platform 102 over the network 103. The network 103 is typically a content delivery network (CDN) built on the Internet, but may include any network, including but not limited to a LAN, a MAN, a WAN, a mobile wired or wireless network, a private network, or a virtual private network.

The clients 104 access the content from web browsers on computing devices connected to the network 103. The computing devices include a personal computer, such as a desktop, laptop, or tablet computer, a personal digital assistant, a mobile or smart phone, or a television "set-top box" using a client web application. The educational content are transformed by the content distribution platform 102 and delivered to the clients 104 across the network 103. As the clients enjoy the consistent reading experiences and high-quality services, the web browsers on the clients' devices regularly communicate with the content distribution platform 102 for updating reading content and connected services. In addition, user data on the clients' experience with the service and quality of the network connections are also collected and uploaded to the content distribution platform 102 through network 103.

In contrast to existing digital publishing services, such as AMAZON KINDLE®, the disclosed content distribution platform does not require users to purchase a specific client device or download a specific application from the service provider to access the content. Rather, any HTML5 compatible browser on a user's computing device may receive, from the content distribution platform 102, structureless HTML5 page elements to construct pages of a document on the browser, along with a host of document specific metadata to enhance the user's reading experience with the document, such as thumbnail navigation and an interactive table of contents. The HTML5 pages of the document also supports a number of reading activities, such as creating highlights, taking notes, and accessing a dictionary Annotations, such as highlights, drawings, notes, comments, and other personalized data created by the user can be displayed as an overlay on the original content, stored and archived in the user account, synchronized across all registered devices of the user, and optionally shared among the user's friends, classmates, campus, or other groups, as part of an education social platform. Noted that although embodiments of the invention are described herein with reference to HTML5, other markup languages with suitable characteristics may also be used in place of HTML5.

Publishing System

FIG. 2 illustrates a block diagram of a publishing system 130, in accordance with an embodiment of the invention. The publishing system 130 is a component of the content distribution platform 102 illustrated in FIG. 1. The publishing system 130 transforms source documents into, for example, markup language documents (e.g., in HTML5 web format) with enhanced metadata suited for distribution to a wide variety of computing devices. The transformed content preserves the original page structure of the source documents, including the pagination of the original printed document, the number of columns and arrangement of paragraphs, the placement and appearance of graphics, titles and captions, and the fonts used, which are collectively referred to as preserving "page fidelity" of the printed document. The publishing system 130 aims to preserve page fidelity, regardless of the original format of the source content provided by the content provider, and regardless of the complexity of the layout of the original document. The publishing system 130 includes four primary sub-systems: transformation 210, metadata 220, correlation 230, and staging 240.

The transformation sub-system 210 converts content 101 including PDF and ePUB files into sets of markup language page elements 201 to remove the need of specific reader applications and/or end-user devices. Similarly, all image content can be transformed into bit maps to keep the original page structure of the content 101. During this transformation process, the metadata sub-system 220 extracts metadata by analyzing file properties and detecting keywords in the content. Basic metadata associated with the content 101 may include ISBN number, author, title, publisher name, release date, short description, cover page, and other book specific data. The transformation sub-system 210 then dissects each page of the source files into elements of information, such as various regions of texts and images, which are converted into markup language page elements. In the meantime, the metadata sub-system 220 creates a set of structure metadata associated with the location and composition of the elements of information. The list of the structure metadata can include, for example, sizes and types of images, locations, captions, number and size of columns, paragraphs, type of layout, embedded references, partial and full content indexing, border size, blank pages, and many other structure metadata, which identifies all the elements on a printed page. Thus, each page of the published content 101 can be transformed into a set of downloadable markup language page elements 201 and the set of associated basic and structure metadata regardless of the original source content format.

During the markup language transformation, page fidelity of the original document can be compromised due to complex layout or target web browser conformity issues. The correlation sub-system 230 in the publishing system 130 automatically analyzes large volumes of source content 101, renders the converted markup language web page elements 201 on a variety of target web browsers and target platforms, and compares the rendered markup language web pages to the corresponding original pages. The correlation sub-system 230 comprises a correlation engine 600, which is configured to automatically compare a rendered markup language page to the original source pages, and establishes a correlation factor between them.

The last component of the publishing system 130 is the content staging sub-system 240. The content staging sub-system 204 monitors the content workflow, stores the processed content, metadata, and other assets, and validates content in preparation for final delivery to end-users.

Correlation Engine

Embodiments of the present disclosure provide a system (and a method and a computer readable storage medium) for correlating document pages. The system includes a document conversion correlation engine 600, which automatically quantifies the differences in page fidelity between a printed document and its markup language transformation during the document digitization process. The correlation engine 600 first analyzes the original document, as well as the rendered markup language conversions. Based on the analysis results, the correlation engine 600 determines a correlation factor between the original document and the rendered content. The correlation factor indicates the page fidelity quality between the printed document and its markup language transformation. If the correlation factor does not meet a threshold established for minimum page fidelity, the page is flagged and its associated digital transformation is examined.

The correlation engine 600 serves as a key component for content validation in the content publishing system 130, given the large volume of documents to process and rapid development in new web technologies. In order to increase the volume of digital content offerings and to facilitate broad content deployment, the correlation engine 600 is configured to analyze and compare large volumes of source content against an even larger number of converted markup language web pages without manual intervention. For example, a textbook typically contains several hundred pages. Once converted, the set of markup language pages may be displayed on a variety of web browsers on different consumer devices across multiple platforms. Taking into consideration the potential compatibility issues inherent from various browsers, such as INTERNET EXPLORER®, FIREFOX®, GOOGLE CHROME®, SAFARI®, and O® Opera Browser, built upon various browser layout engines (e.g., WEBKIT®, Gecko, Trident, and PRESTO®) on top of different platforms, such as desktop OSes (e.g., MICROSOFT WINDOWS®, MAC OS®, and LINUX®) and mobile OSes (e.g., IOS®, ANDROID®, and WEBOS®), the converted web pages have to be rendered and checked on each and every one of these browsers and platform combinations. Therefore, the several hundred pages contained in the typical textbook need to be compared, by the correlation engine, against thousands of rendered converted markup language pages for page fidelity accuracy.

Figure 3:
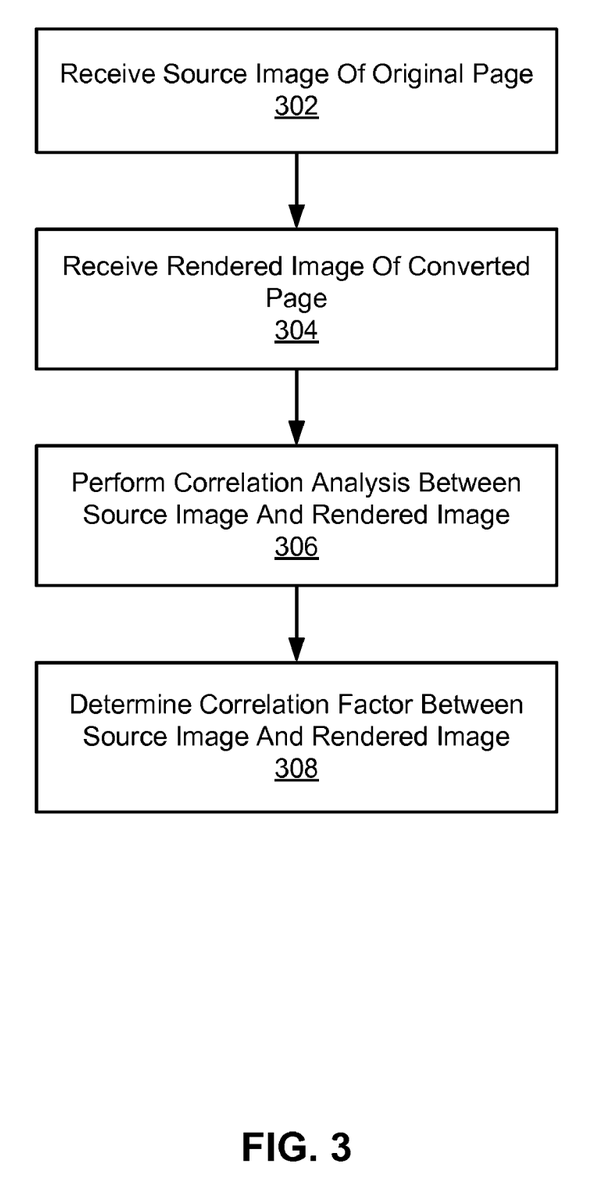
FIG. 3 is a flowchart illustrating the method of performing document conversion correlation, in accordance with an embodiment of the invention.

FIG. 3 illustrates a flowchart illustrating an example method of performing document conversion correlation, such as would be executed by a correlation engine 600, in accordance with an embodiment of the invention. First, a source image of an original page is received 302. For example, the publishing system 130 receives a book as part of source content 101, as described above with reference to FIG. 2. In a separate process, each page of that book is converted into a separate bitmap image and identified as an individual source image. There are no changes in content layout and page fidelity in the source images, which are 100% identical to the original book pages.

Next, a rendered image of the converted page in a target makeup language is received 304. For example, the publishing system 130 transforms the book into a set of markup language page elements 201, as described above with reference to FIG. 2. In another separated process, those markup language page elements for a respective page are displayed by a target web browser on a target platform, in an effort to keep the page structure and layout of the original book page. The displayed web page is also rendered as a separate bitmap image and identified as an individual rendered image.

Subsequently, the correlation analysis between the source image and rendered image is performed 306. The correlation engine may adopt various analysis techniques for comparing the rendered image to the sourced image. The selection of a particular technique for correlation analysis may depend on the complexity of the pages. In one embodiment, a simple text comparison algorithm can be used for book pages with only texts. In another embodiment, for example, a statistical method similar to a face recognition algorithm in video or image processing can be utilized to document layouts that include not only texts but also graphics and images.

In other embodiments, more complicated approaches can be applied to check page layout fidelities. Instead of treating an individual page as a whole, the page is dissected into a collection of basic elements following rules to identify different parts. Each individual page may be analyzed to determine regions of characters, blank spaces, and images. To further determine whether a region corresponds to a heading, subheading, body text, caption, or other identifiable parts, the font size, the relative position of the region or objects, and the presence and/or absence of entries in the table of contents or index, are all taken into considerations in categorizing regions. For example, a text region adjacent to an image with relatively few words that matches the text in the figures' list is most likely a caption of the image. When individual pages are processed into multiple regions, the correlation engine can be designed around a customized analysis, which combines the principal components analysis (PCA) and linear discriminant analysis (LDA) algorithm.

Figure 4A:
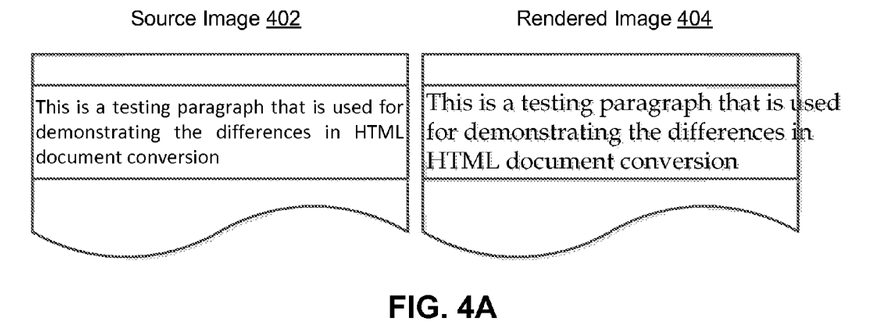
FIG. 4A is a block diagram illustrating a horizontal shearing in document conversion, in accordance with an embodiment of the invention.
Figure 4B:
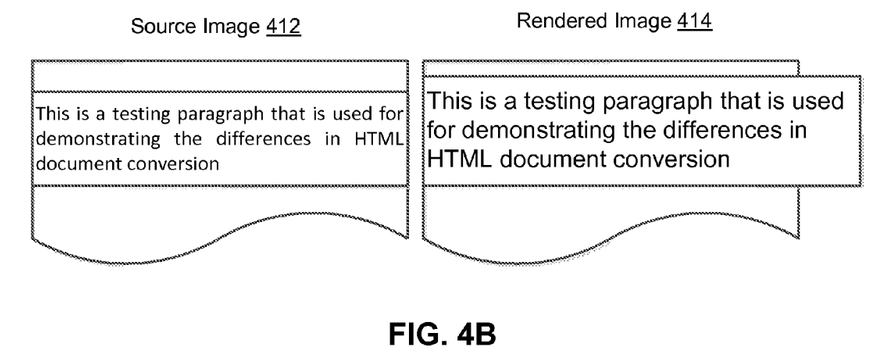
FIG. 4B is a block diagram illustrating an uneven scaling in document conversion, in accordance with an embodiment of the invention.
Figure 4C:
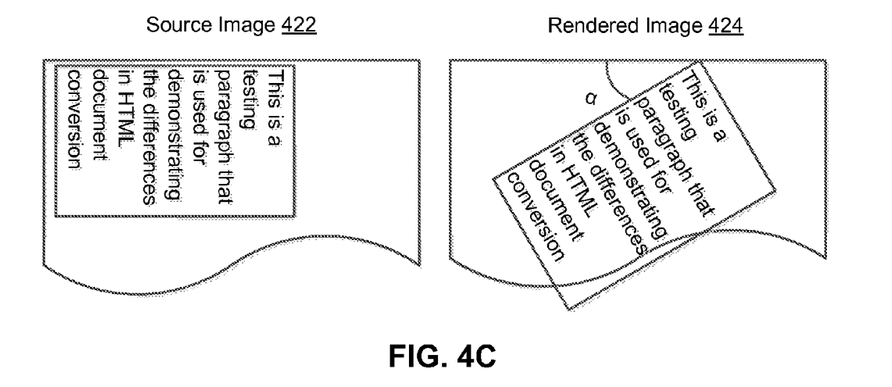
FIG. 4C is a block diagram illustrating a content rotation in document conversion, in accordance with an embodiment of the invention.

The combined PCA-LDA algorithm works on detecting distortions of regions, which may be caused by: special characters, rare fonts not available on a platform, or web browser conformity issues due to unusual complex layouts. For example, FIG. 4A is a block diagram illustrating a horizontal shearing in document conversion, in accordance with an embodiment of the invention. A testing paragraph is displayed within an original textbox in the source image 402. In the rendered image 404, the textbox maintains its size and location. However, the text is rendered in a different font and a different size, which results in a horizontal shearing on the right side of the textbox. Similarly, FIG. 4B is a block diagram illustrating an uneven scaling in document conversion, in accordance with an embodiment of the invention. The textbox of the testing paragraph in the rendered image 414, compared to the source image 412, is scaled up both horizontally and vertically. FIG. 4C is a block diagram illustrating a content rotation in document conversion, in accordance with an embodiment of the invention. In FIG. 4C, the textbox in rendered image 422 is rotated an angle of $\alpha$ clockwise compared to the source image 422.

The PCA algorithm first normalizes the respective sizes of different regions by lining up their top and bottom or left and right coordinates, and generates a matrix that contains information on the location and size of all the corresponding regions in the source page and rendered page. The PCA algorithm then reduces the dimension of the matrix to reveal the most effective lower dimensional representation of the page. The resulting matrix with a reduced dimension removes information less useful and decomposes precisely the sourced and rendered content pages into uncorrelated components specific to a document page layout. The LCA algorithm works as a pre-filter process for the PCA algorithm. This filtering process aims to maximize between class variance (across regions) and minimize within-class variance (within regions). The outcome of the process is a page-specific list of regions that can be stored in a vector and compared between the source and rendered pages.

Referring again to FIG. 3, after the correlation analysis between the source image and rendered image is performed 306, a correlation factor C between the source image and rendered image is determined 308. The correlation factor C can be a score between 0 and 100, where 0 means no correlation at all and 100 means a perfect match. In case of the PCA-LCA analysis, the correlation factor C can be defined as a weighted sum of fidelity quality of all the corresponding regions in a pair of source and rendered pages.

Figure 5:
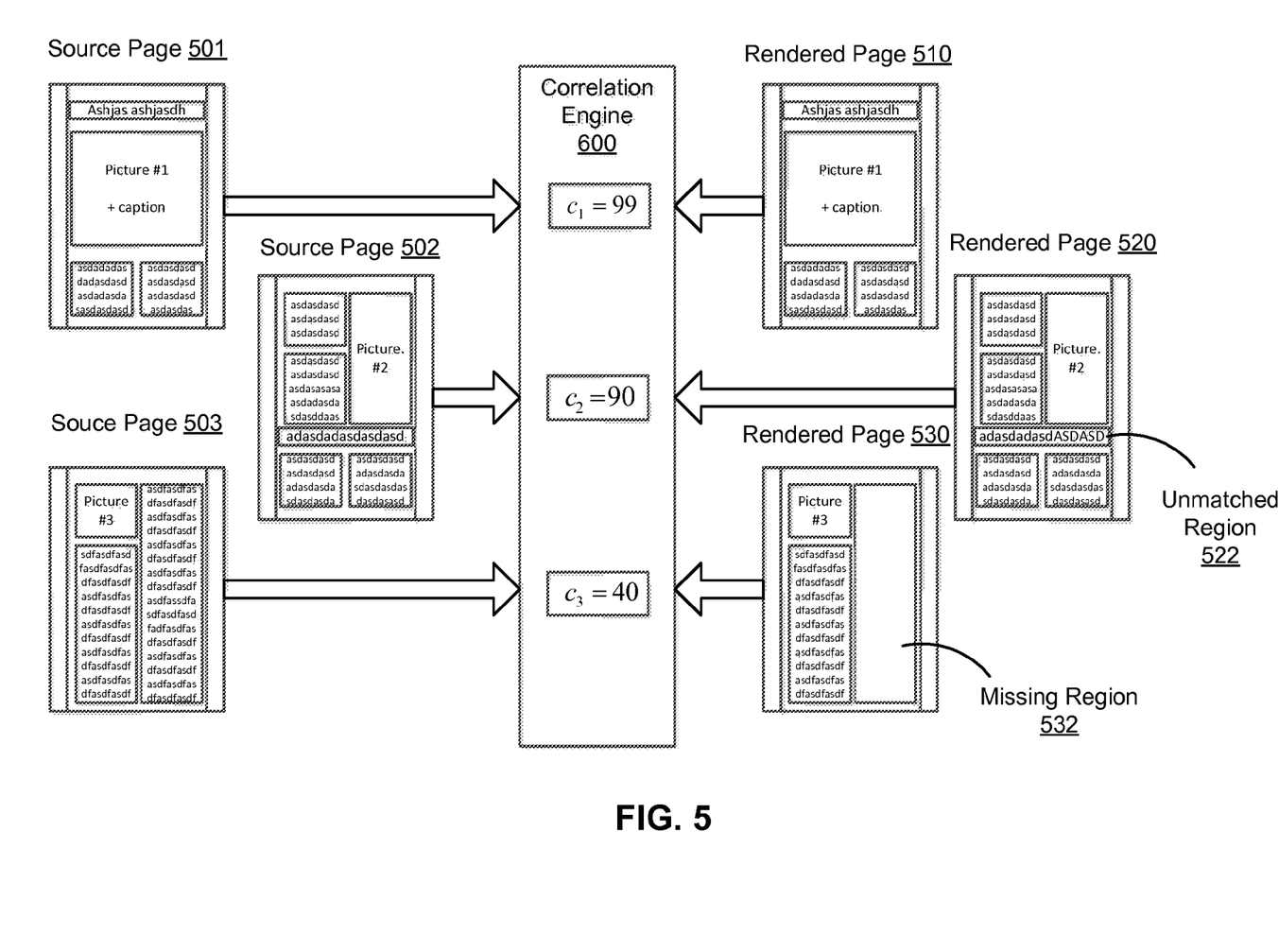
FIG. 5 is a block diagram illustrating the outcome of a correlation engine, in accordance with an embodiment of the invention.

FIG. 5 is a block diagram illustrating the outcome of the correlation engine 600, in accordance with an embodiment of the invention. In FIG. 5, the correlation engine 600 performs correlation analysis on three pair of document pages 501 and 510, 502 and 520, and 503 and 530. The outcome correlation factor C for each pair of the document pages is a number within a range between 0 and 100, where 0 means no correlation at all and 100 means a perfect match. The correlation factor between pages 501 and 510 is 99, which is near perfection, while correlation factor between pages 502 and 520 is 90 due to a small unmatched region 522. Rendered page 530, on the other hand, contains a missing region 532 compared to the source page 503, which results in a low correlation factor value of 40. In other embodiments, the PCA-LCA correlation analysis can also identify the regions with problems, such as the unmatched region 522 and the missing region 532.

A minimum requirement on the page fidelity during document conversion can be established in terms of a threshold or a predefined value of the correlation factor. This threshold correlation factor may vary depending on the category of the books and complexity of the page layout of the particular books. Converted pages with correlation factors higher than the threshold are deemed qualified to pass the validation check, whereas pages with correlation factors lower than the threshold are flagged, which are subjected to further examination, correction, and re-conversion. For example, if the threshold of correlation factor is set at 90 for the pages in FIG. 5, the rendered page 510 passes the check, and page 520 may also be validated if the unmatched region 522 does not affect users' experience with the page. Rendered page 530, on the other hand, is flagged and subjected to further examination.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art.

These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method of correlating document images, the method comprising:
    receiving a source image representing an original document page;
    receiving a rendered image representing a markup language page rendered by a browser, the markup language page generated by converting one or more elements in the original document page into markup language elements;
    performing, by a computer, a correlation analysis comprising image comparison between the source image and the rendered image to determine a page fidelity of the converted markup language page;
    determining, by the computer, a correlation factor based on the correlation analysis, the correlation factor indicating the page fidelity of the converted markup language page compared to the original document page, wherein the correlation factor is a number within a numeric range, the numeric range extending between a first numeric value signifying no correlation and a second numeric value signifying a perfect match; and
    responsive to the correlation factor exceeding a specified threshold value, determining that the converted markup language page has passed a validation check.

2. The method of claim 1, wherein the one or more elements in the original document page comprises at least one of an image, a graph, a table, a formula, and a body of texts.

3. The method of claim 1, wherein converting one or more elements in the original document page into markup language elements further comprises capturing position and composition information of the one or more elements in the original document page to preserve page fidelity.

4. The method of claim 1, wherein the rendered image of the markup language page is rendered by a specific web browser on a specific software platform.

5. The method of claim 1, wherein the image comparison between the source image and the rendered image comprises applying at least one of:
    a text comparison algorithm;
    an image comparison algorithm;
    a principal components analysis (PCA) algorithm; a linear discriminant analysis (LDA) algorithm; and
    any combination of the above algorithms.

6. The method of claim 1, wherein the numeric range extends between 0 indicating no correlation and 100 indicating a perfect match.

7. The method of claim 1, wherein:
    the specified threshold value of the correlation factor corresponds to a requirement of the page fidelity based on a type and layout of the original document page.

8. The method of claim 1, further comprising:
    responsive to the correlation factor being lower than the specified threshold value, determining that the converted markup language page is subject to further review.

9. A non-transitory computer-readable storage medium storing executable computer program instructions for document images correlation, the computer program instructions comprising instructions for:
    receiving a source image representing an original document page;
    receiving a rendered image representing a markup language page rendered by a browser, the markup language page generated by converting one or more elements in the original document page into markup language elements;
    performing a correlation analysis comprising image comparison between the source image and the rendered image to determine a page fidelity of the converted markup language page;
    determining a correlation factor based on the correlation analysis, the correlation factor indicating the page fidelity of the converted markup language page compared to the original document page, wherein the correlation factor is a number within a numeric range, the numeric range extending between a first numeric value signifying no correlation and a second numeric value signifying a perfect match; and responsive to the correlation factor exceeding a specified threshold value, determining that the converted markup language page has passed a validation check.

10. The non-transitory computer-readable medium of claim 9, wherein the one or more elements in the original document page comprises at least one of an image, a graph, a table, a formula, and a body of texts.

11. The non-transitory computer-readable medium of claim 9, wherein converting one or more elements in the original document page into markup language elements further comprises capturing position and composition information of the one or more elements in the original document page to preserve page fidelity.

12. The non-transitory computer-readable medium of claim 9, wherein the rendered image of the markup language page is rendered by a specific web browser on a specific software platform.

13. The non-transitory computer-readable medium of claim 9, wherein the image comparison between the source image and the rendered image comprises applying at least one of:
    a text comparison algorithm;
    an image comparison algorithm; a principal components analysis (PCA) algorithm;
    a linear discriminant analysis (LDA) algorithm; and
    any combination of the above algorithms.

14. The non-transitory computer-readable medium of claim 9, wherein the numeric range extends between 0 indicating no correlation and 100 indicating a perfect match.

15. The non-transitory computer-readable medium of claim 9, wherein:
    the specified threshold value of the correlation factor corresponds to a requirement of the page fidelity based on a type and layout of the original document page.

16. The non-transitory computer-readable medium of claim 9, further comprising instructions for:
    responsive to the correlation factor being lower than the specified threshold value, determining that the converted markup language page is subject to further review.

17. A system for correlating document images, the system comprises:
    a processor;
    a receiving mechanism configured to receive a source image representing an original document page, and a rendered image representing a markup language page rendered by a browser, the markup language page generated by converting one or more elements in the original document page into markup language elements;
    a correlation-analysis mechanism, coupled to the processor, configured to perform a correlation analysis comprising image comparison between the source image and the rendered image to determine a page fidelity of the converted markup language page, determine a correlation factor based on the correlation analysis, the correlation factor indicating the page fidelity of the converted markup language page compared to the original document page, the correlation factor being a number within a numeric range, the numeric range extending between a first numeric value signifying no correlation and a second numeric value signifying a perfect match, and responsive to the correlation factor exceeding a specified threshold value, determine that the converted markup language page has passed a validation check.

18. The system of claim 17, wherein the one or more elements in the original document page comprises at least one of an image, a graph, a table, a formula, and a body of texts.

19. The system of claim 17, wherein converting one or more elements in the original document page into markup language elements further comprises capturing position and composition information of the one or more elements in the original document page to preserve page fidelity.

20. The system of claim 17, wherein the rendered image of the markup language page is rendered by a specific web browser on a specific software platform.

21. The system of claim 17, wherein the image comparison between the source image and the rendered image comprises applying at least one of:
    a text comparison algorithm;
    an image comparison algorithm; a principal components analysis (PCA) algorithm;
    a linear discriminant analysis (LDA) algorithm; and
    any combination of the above algorithms.

22. The system of claim 17, wherein the numeric range extends between 0 indicating no correlation and 100 indicating a perfect match.

23. The system of claim 17, wherein the specified threshold value of the correlation factor corresponds to a requirement of the page fidelity based on a type and layout of the original document page.

24. The system of claim 17, wherein the correlation-analysis mechanism is further configured to:
    responsive to the correlation factor being lower than the specified threshold value, determine that the converted markup language page is subject to further review.

* * * * *